US010331688B2

(12) United States Patent
Montgomery et al.

(10) Patent No.: US 10,331,688 B2
(45) Date of Patent: Jun. 25, 2019

(54) SYSTEMS AND METHODS FOR SEARCHING CONTENT FROM MULTIPLE SOURCES

(71) Applicant: HYLAND SWITZERLAND SÀRL, Geneva (CH)

(72) Inventors: Thomas David Montgomery, Denver, CO (US); Derek Cunninghame Murphy, Highlands Ranch, CO (US); Benjamin Stephen Truscott, Highlands Ranch, CO (US)

(73) Assignee: HYLAND SWITZERLAND SÀRL, Geneva (CH)

( * ) Notice: Subject to any disclaimer, the term of this patent is extended or adjusted under 35 U.S.C. 154(b) by 676 days.

(21) Appl. No.: 14/609,102

(22) Filed: Jan. 29, 2015

(65) Prior Publication Data

US 2015/0213096 A1      Jul. 30, 2015

Related U.S. Application Data

(60) Provisional application No. 61/933,199, filed on Jan. 29, 2014.

(51) Int. Cl.
*G06F 16/248* (2019.01)
*G06F 17/30* (2006.01)

(52) U.S. Cl.
CPC ...... *G06F 16/248* (2019.01); *G06F 17/30554* (2013.01)

(58) Field of Classification Search
CPC ................................ G06F 17/30554
See application file for complete search history.

(56) References Cited

U.S. PATENT DOCUMENTS

| | | | |
|---|---|---|---|
| 8,543,904 B1* | 9/2013 | Karls | H01L 27/222 707/704 |
| 2005/0071323 A1* | 3/2005 | Gabriel | G06F 17/30817 |
| 2010/0082634 A1* | 4/2010 | Leban | G06F 17/30991 707/741 |
| 2010/0241652 A1* | 9/2010 | Fasihuddin | G06F 17/30864 707/769 |
| 2011/0231383 A1* | 9/2011 | Smyth | G06F 17/30522 707/707 |
| 2012/0271807 A1* | 10/2012 | Smyth | G06F 17/30864 707/706 |
| 2014/0172549 A1* | 6/2014 | Esmailzadeh | H04L 51/32 705/14.45 |
| 2015/0170203 A1* | 6/2015 | Kogan | G06Q 30/0256 705/14.54 |

* cited by examiner

*Primary Examiner* — Etienne P Leroux
*Assistant Examiner* — Dara J Glasser
(74) *Attorney, Agent, or Firm* — Medley, Behrens & Lewis, LLC

(57) ABSTRACT

A method for searching data on multiple domains includes transmitting a search query to an enterprise domain; receiving, from the enterprise domain, enterprise content matching the search query; receiving, from the enterprise domain, a search query normalized for searching a social site domain, the normalized search query being the search query in a format recognizable by the social site domain; transmitting the normalized search query to the social site domain; and receiving, from the social site domain, social site content matching the normalized search query.

14 Claims, 9 Drawing Sheets

SYSTEMS AND METHODS FOR SEARCHING CONTENT FROM MULTIPLE SOURCES

CROSS REFERENCES TO RELATED APPLICATIONS

Pursuant to 35 U.S.C. § 119, this application is related to and claims the benefit of the earlier filing date of provisional application Ser. No. 61/933,199, filed Jan. 29, 2014, entitled "System and Methods for Searching Content from Multiple Sources," the contents of which is hereby incorporated by reference herein in their entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to searching methods, and more particularly, to enterprise and social network searching.

2. Description of the Related Art

The advent of information technology and information systems has significantly influenced the prospect of information sharing. Various types and forms of information are created at a rapid rate by different people, in different languages, and in different locations. With the widespread use of computer systems and the interconnectivity between computer systems, users are able to access to information, whether public or private, more easily. However, due to the huge amount of information produced, it has also become challenging for some users to locate or find the information they desire.

In some cases, users perform multiple searches in order to find desired or needed information. For example, a user may wish to find information from one source, such as information from an organization or enterprise. In addition, the user may also desire to find related information from other sources, such as from a social network or site, in order to gain additional information, wisdom or knowledge from a larger community. For example, a company or manufacturer may want to see how a new product or service is perceived by users or customers in a social community. In order to search for both enterprise and social content, the user may have to launch a search engine supported by the enterprise and launch separate searches using other search mechanisms or engines supported by the social sites, which may take additional time and be inconvenient. Moreover, the search results may appear in different displays or pages such that the user may have difficulty analyzing or relating the enterprise and social search results.

Accordingly, there is a need to enable users to search content from multiple domains or sources, and more efficiently analyze and explore relationships and connections between different, but related pieces, of information from the different sources.

SUMMARY

Systems capable of and methods for searching content from multiple sources are disclosed.

One example method for searching data on multiple domains includes transmitting a search query to an enterprise domain; receiving, from the enterprise domain, enterprise content matching the search query; receiving, from the enterprise domain, a search query normalized for searching a social site domain, the normalized search query being the search query in a format recognizable by the social site domain; transmitting the normalized search query to the social site domain; and receiving, from the social site domain, social site content matching the normalized search query.

In some example aspects, the method may further include rendering at least a portion of the matching social site content on a user interface; and rendering at least a portion of the matching enterprise content on the user interface. The rendering at least a portion of the matching social content and the rendering the at least a portion of the matching enterprise content may occur asynchronously. In other example aspects, the rendering at least a portion of the matching social content may occur without obscuring the rendering at least a portion of the matching enterprise content.

A second example method for searching data on multiple domains includes searching an enterprise domain for content matching a search query; transmitting matching enterprise content to a client device for rendering in a user interface; normalizing the search query for a social site domain; and transmitting the normalized search query to the client device. The client device transmits the normalized search query to the social site domain and receives social site content matching the normalized search query for rendering in in the user interface without refreshing the user interface.

A third example method for searching data on multiple domains using a browser includes receiving a search request; performing a search for enterprise data matching the search request; indicating, via a user interface, whether matching enterprise data exists; sending the search request to a social site for searching for social data matching the search request; and receiving the matching social data. In one aspect, the indicating includes rendering at least a portion of the matching enterprise data if matching data is located.

One example system for searching data on multiple domains using a browser includes a client device communicatively coupled to an enterprise search server and a web browser located on the client device. The web browser is communicatively coupled to a social site server. When a search for enterprise data and social site data is performed, enterprise search results matching the search are rendered on a single web page with social search results matching the search. In one aspect, the social search results are organized by social site source. In another aspect, the social search results are rendered without a need to redraw the web page.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

DETAILED DESCRIPTION

Figure 1:
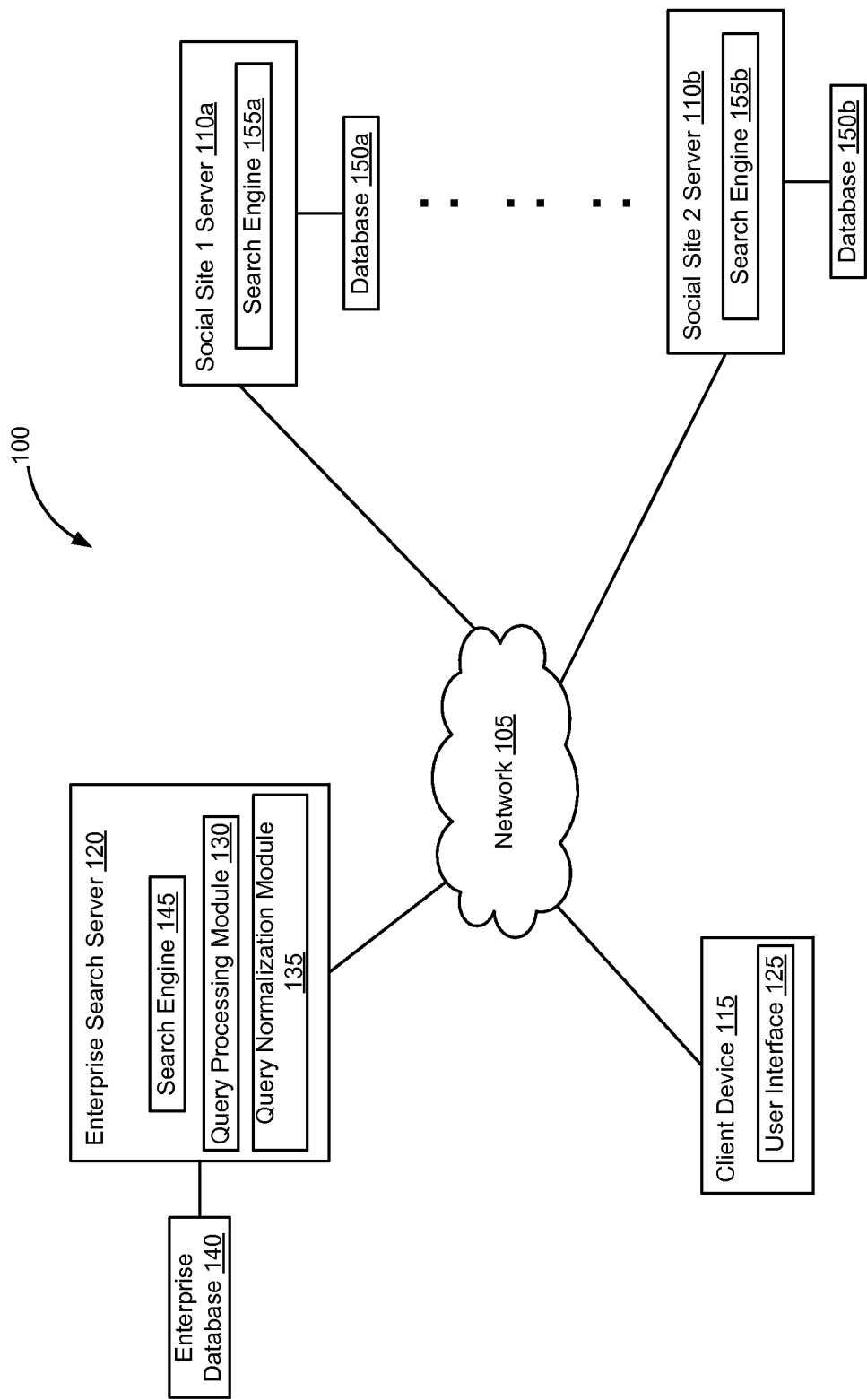
FIG. 1 is one example embodiment of a networked system.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and an herein do not denote a limitation of quantity but rather denote the presence of at least one of the referenced item.

In addition, it should be understood that example embodiments of the disclosure may include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable storage medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are systems and methods for retrieving enterprise data from an enterprise domain and social data from one or more social sites using a single search query received from a user. According to one example embodiment of the present disclosure, a user of a client device may send a search query to an enterprise search server via a network using a client software application, such as a browser software application, running on the client device. The enterprise search server, upon receiving the search query from the client device, may search for enterprise data or content matching the search query. The enterprise search server may then return matching enterprise data or content to the client device for rendering on a user interface, such as the browser software application, of the client device. In one example embodiment, the search query may be automatically or non-programmatically sent to one or more social site services via the network to search for social data. The one or more social site services, upon receiving the search query, may search an associated database for social data or content matching the search query. The one or more social site services may then provide matching social data to the client device for rendering on the user interface of the client device. According to one example embodiment, the presentation of enterprise search results and social search results may be asynchronous. In another example embodiment, social search results may be rendered on the same page as, and without obscuring, enterprise search results.

The example systems and methods described herein search for data and content on multiple domains using a single search request initiated by a user at a client device. More particularly, the example systems and example methods may allow acquisition of social information in addition to enterprise information using an internal search process on the enterprise system and an external search process on one or more social networking sites using a single search query. The example systems and methods may also allow viewing of both enterprise and social information resulting from the search query on the same display so that users can more easily analyze and explore relationships between enterprise information and social information.

FIG. 1 illustrates a networked system 100 according to one example embodiment of the present disclosure. System 100 may be a data communication system that may include a network 105 that interconnects a client device 115, an enterprise search server 120, and at least one social site server. FIG. 1 is shown with two social site servers 110a, 110b, but it will be appreciated by those skilled in the art that in other example embodiments, system 100 may include even more social site servers. In still other example embodiments, system 100 may include only one social site server.

Client device 115 may be any computing device. In one example embodiment, client device 115 may be, for example, a personal computer. Client device 115 may include an input device (e.g., a keyboard), a processor, and memory, such as random access memory (RAM), read-only memory (ROM), and/or non-volatile random access memory (NVRAM). Client device 115 may also include a display unit or monitor having a user interface 125, such as a graphical user interface. Client device 115 may further include a mass data storage device, such as a hard drive, CD-ROM and/or DVD units. Additionally, client device 115 may include at least one control unit such as, for example, a processor (not shown) that controls the operation of the computing device.

In another example embodiment, client device 115 may be any computing device that is portable, handheld or pocket-sized such as, for example, a mobile device (e.g., a cellular telephone or a smart phone); a handheld computer; a personal digital assistant (PDA); a notebook computer; a netbook; a tablet computer; or any other remote computing device, such as a special-purpose remote computing device (e.g., an electronic or e-book reader).

Client device 115 may be programmed with one or more software applications which may enable users to access, retrieve, and view files, information, and other resources on the Internet. In one example embodiment, client device 115 may be programmed with a web browser software application. User interface 125 download content from one or more servers via network 105 to create and render web pages on user interface 125. In some example aspects, user interface 125 may be a web browser window.

Enterprise search server 120 may be a system, such as a data storage or enterprise content management system, used by an organization or enterprise to respond to data requests and/or provide services to private users within an enterprise domain and/or to public users from external domains via network 105. In one example aspect, enterprise search server 120 may include a query processing module 130 for analyzing attributes of queries or requests sent to enterprise search server 120. In another example aspect, enterprise search server 120 may include a query normalization module 135 for converting a search query into a format recognizable or otherwise suitable for presentation to a specific destination within or outside the enterprise domain. Enterprise search server 120 may be part of a group of geographically dispersed servers that may be registered to the enterprise domain. The enterprise domain may be used to access the group of servers, among which is enterprise search server 120.

In one example embodiment, enterprise search server 120 may be used to search for enterprise data to be provided to a device, such as client device 115, upon a user-initiated request. Enterprise data may include data used by an enterprise or organization such as, for example, profiles, contact information, e-mails, documents, images, news feeds, products, services, and/or events associated with the enterprise.

Enterprise data may be stored in an enterprise data storage facility or database 140 that is accessible by enterprise search server 120.

Enterprise search server 120 may host one or more web pages. In one example embodiment, enterprise search server 120 may host a web page for searching and browsing data from enterprise database 140. Client device 115 may download content required to create or render a search web page on user interface 125, and the search web page may be used by a user of client device 115 to input, create, initiate and/or send a search query to enterprise search server 120. The search web page may be used to display or render content and/or information matching the search query. In some other example aspects, a different web page may be used to display or render content and/or information matching the search query.

Enterprise search server 120 may utilize an enterprise search engine 145 for searching enterprise data stored in enterprise database 140. In one example embodiment, enterprise search engine 145 may reside on enterprise search server 120 and may comprise program instructions and code for executing searches on enterprise database 140 based on a search query. The search query may be received from a user or another software program.

In another example embodiment, enterprise search engine 145 may reside or be part of another device or computer system connected to enterprise search server 120 and configured to perform searching operations on enterprise database 140. In one example aspect, enterprise search engine 145 may store an index of words and corresponding Uniform Resource Locators (URLs) which point to virtual locations of the indexed words. Upon receiving a search query, enterprise search engine 145 may search through the index to look for characters or words that match the search query. The URLs of the characters or words that match the search query and/or other related information may be provided by enterprise search server 120 as enterprise search results to client device 115 for display to the user. It will be appreciated that enterprise search engine 145 may employ any suitable algorithms and techniques known in the art.

Social site servers 110a, 110b may be servers which provide social networking services. For example, social networking services may refer to online services, platforms, or sites that allow individuals, groups, organizations, or other social units to form online communities and share social information or data such as, for example, texts, photos, audio content, videos, ideas, profiles, events, interests, activities, comments, hyperlinks, documents and/or other personal information. Examples of social networking sites or social site services may include Facebook®, LinkedIn®, Twitter®, and Flickr®. Each social site server 110a, 110b may have access to a corresponding social site database 150a, 150b, each of which stores social content, information and/or data. Such social content, information or data may be private or public. Private social information refers to content or data that requires user authentication, such as a user name and/or password, in order to be accessible to, released to and/or viewed by a user. Private social information may also refer to content, information and/or data shared only with certain individuals or groups designated by a user. Public social information refers to content, information or data that is generally available to the public.

Social site servers 110a, 110b may each have a social search engine 155a, 155b capable of executing a search for social data stored in respective databases 150a, 150b based on a received search query. Social search engines 155a, 155b may interface over network 105 with enterprise search server 120 and/or client device 115 through integrated or embedded applications configured therein. Such integrated or embedded applications may be developed using Application Programming Interfaces (APIs) released or provided by the social site owners to allow users, such as administrators and developers, to integrate functions into applications for accessing the social search services. Social search engines 155a, 155b may receive search queries from various sources such as, for example, client device 115 and enterprise search server 120, via network 105 and perform searches according to its own search algorithm(s).

Network 105 may be any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein. Other types of networks and communications modes may be used to enable direct or indirect connections between client device 115, enterprise search server 120, and social site servers 110a, 110b as will be known in the art.

Figure 2:
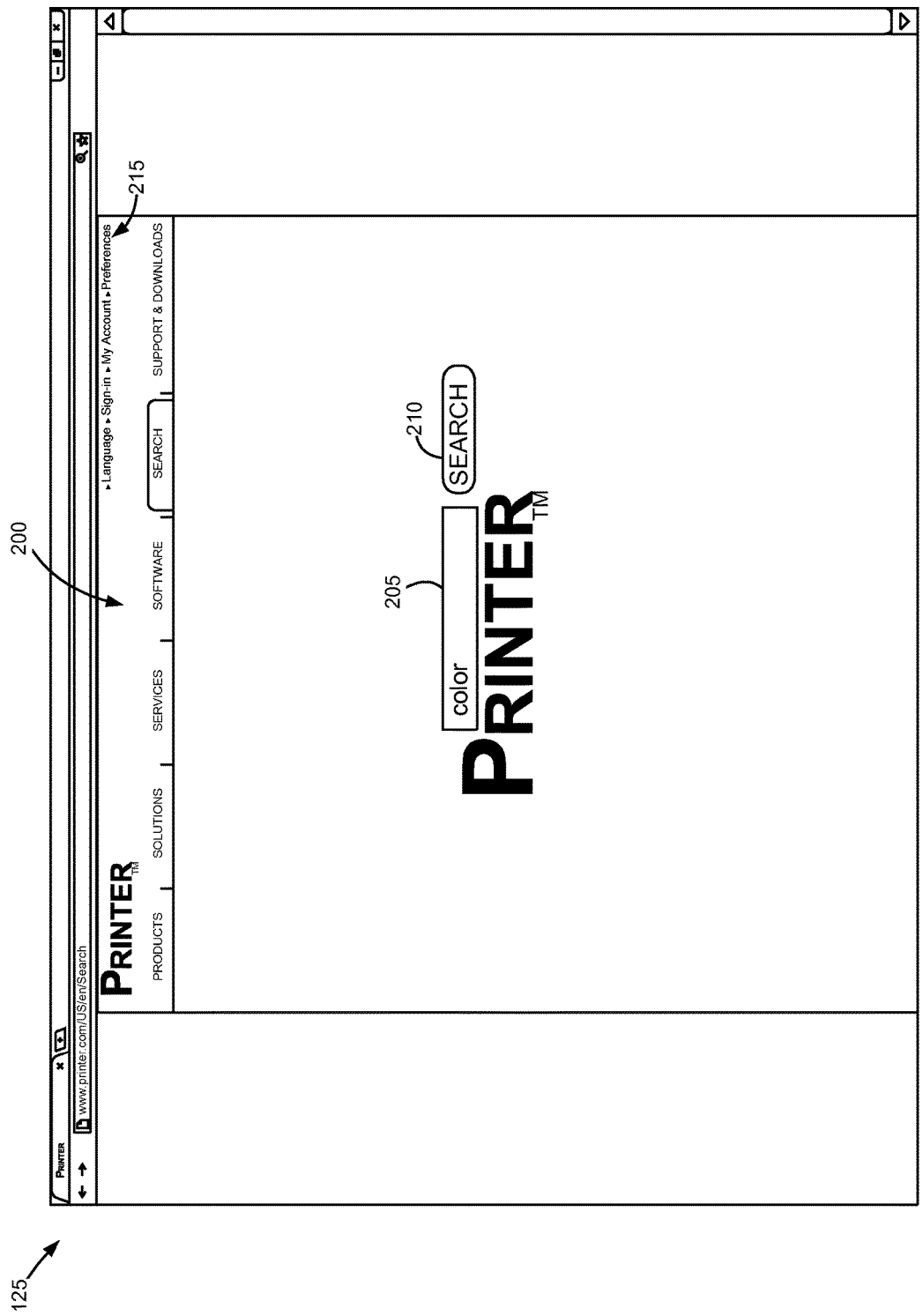
FIG. 2 illustrates one example search interface of the networked system of FIG. 1 implemented as a web page.

FIG. 2 shows one example embodiment of a search user interface implemented as a search web page 200 hosted by enterprise search server 120 and displayed in user interface 125 of client device 115. Search web page 200 may include a search input field 205 and a search control button 210. Generally, a user may search for enterprise and social data by entering search criteria or keywords into search field 205 and clicking, pressing otherwise activating search control button 210 to initiate the search. Search web page 200 may also contain a link 215 to a preferences menu or page which allows the user to set options and/or settings associated with performing a search.

Figure 3:
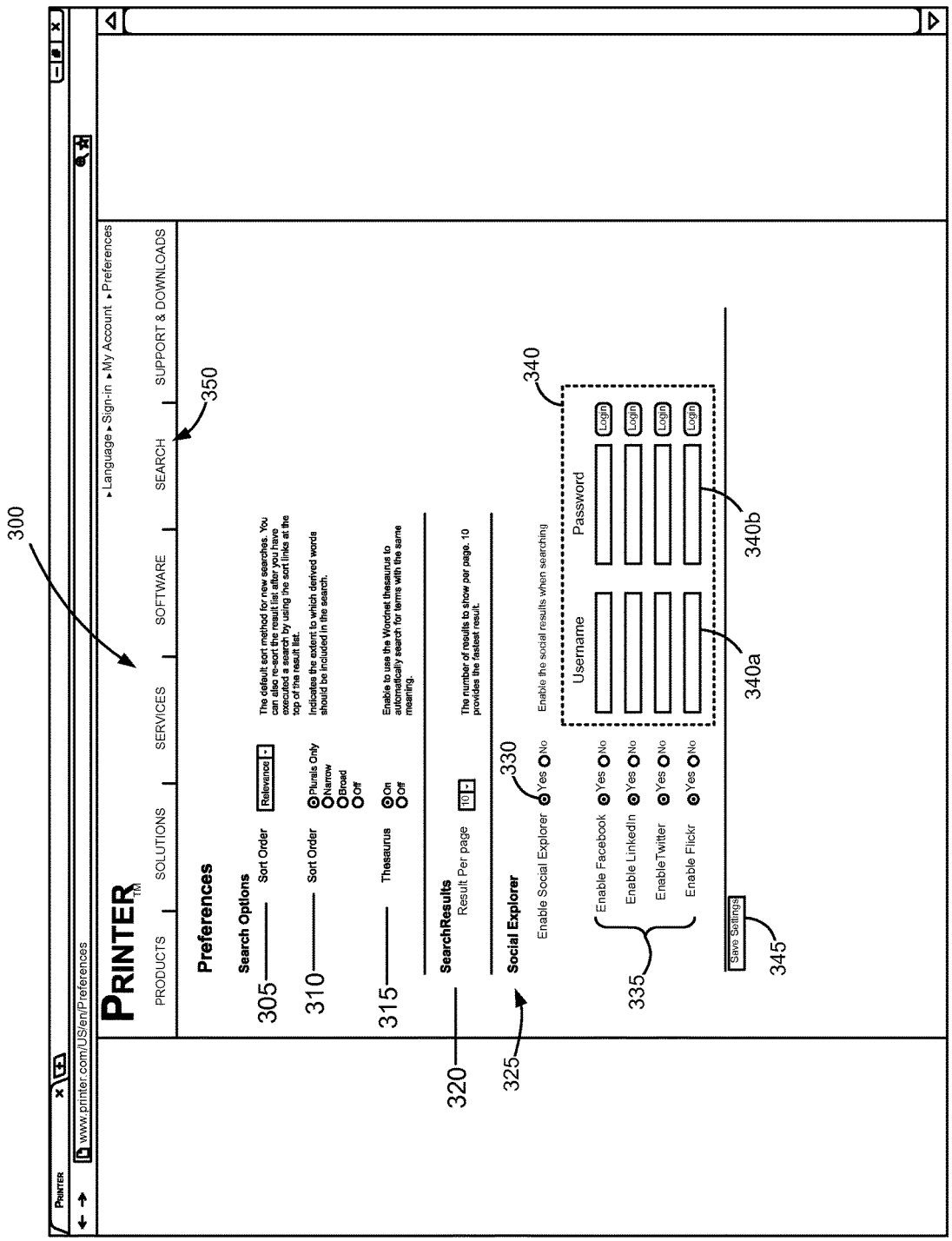
FIG. 3 illustrates one example user interface for configuring preferences for a search operation.

FIG. 3 illustrates one example embodiment of a preferences page 300 for configuring preferences of a search operation. Preferences page 300 may provide various user search preferences relating to search services. For example, preferences page 300 may include options for sorting search results 305, for including derived words in the search 310, for enabling a thesaurus to allow the searching of alternative search terms (i.e., antonyms and/or synonyms) 315, and for displaying the number of search results to show per page 320. In one example embodiment, preferences page 300 may also include an option whereby the user can elect or choose whether to enable a Social Explorer option 325 to enable social results when searching. It will be appreciated that other search options or settings may be included in addition to and/or in lieu of the search options shown in FIG. 3.

In one example aspect, upon enabling Social Explorer option 325, such as by selecting radio button 330, one or more of the social site services or social networking sites 335 listed under Social Explorer option 325 may be automatically selected, such that social search results from the enabled social site services are includes in the search results. In another example aspect, upon enabling Social Explorer option 325, the user may manually select one or more of the social site services 335 to be included in the social search. In some other example embodiments, the list of social site services 335 may be omitted, and social site services 335 may be directly and automatically enabled by the selection to enable Social Explorer option 325.

In still other example embodiments, other social networking sites may be included in lieu of or in addition to social site services 335. In order to extend or activate an unlisted social site when Social Explorer option 325 is enabled, a user, administrator or developer may need to provide code that deals with a URL associated with the social site, an API that may allow integration of functions for communicating with the social site, a query translation mechanism for translating a search query to the destination social site syntax, a mechanism for facilitating supply of credentials to the social site, and/or a mechanism for normalizing results from the social site into a standard format for rendering.

In one example aspect, preferences page 300 may include additional fields 340 for entering user credentials for each of the listed social site services 335. For example, fields 340 may include username fields 340a and password fields 340b where the user can manually input credentials for configuring the search to allow access to private information from a corresponding social site, as will be explained in greater detail below. In some example aspects, input credentials are not needed.

Preferences page 300 may include a save settings control button 345 to allow the user to save preferred settings and search preferences. In one example embodiment, upon activating save settings control button 345, the user may be automatically redirected back to search web page 200. In another example embodiment, preferred settings and search preferences may be automatically saved when a user leaves preferences page 300 or upon depressing a pre-designated key, such as an enter or return key. In still other example embodiments, preferences page 300 may include a search tab 350, which when selected or pressed, allows the user to return to search web page 200 from preferences page 300. In other example embodiments, the user may utilize functionalities of user interface 125 to return to search web page 200.

Figure 4:
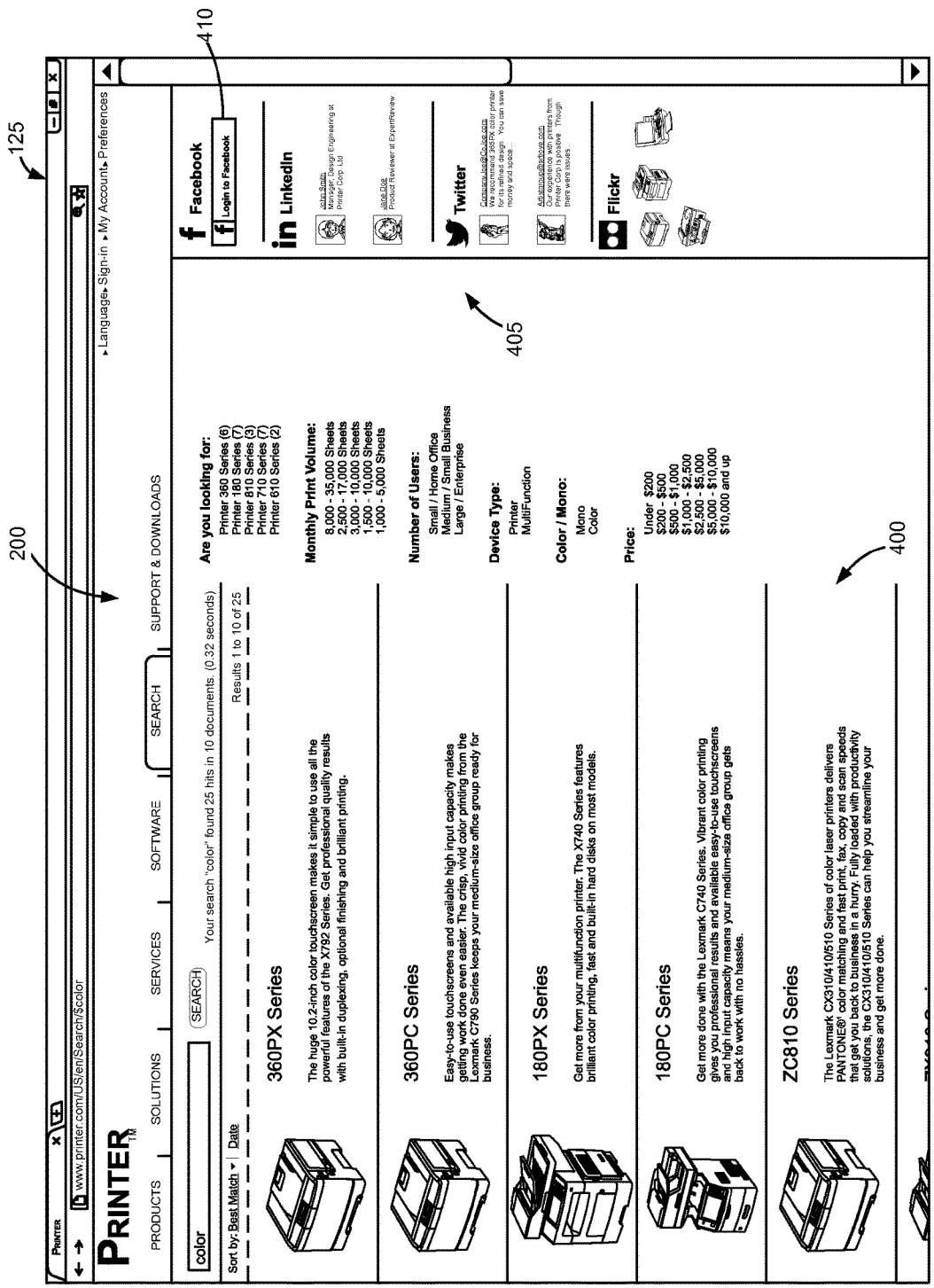
FIG. 4 illustrates one example user interface for displaying search results from multiple sources.

FIG. 4 illustrates one example user interface 125 for displaying search results from multiple sources. Search web page 200 may display a listing of search results on user interface 125. Search web page 200 displays search results comprising the enterprise search results 400 returned by a search on enterprise database 140 and social search results 405 returned by a search on one or more of social site databases 150a, 150b. In some example embodiments, search results may be rendered on a page different than search web page 200.

By integrating social services into enterprise applications, users may no longer need to launch and/or access different websites to retrieve enterprise and social information. Moreover, users have with the convenience viewing both enterprise and social information on the same display or page so that the users can more easily analyze and explore relationships between both types of information. For example, in the example shown in FIG. 4, enterprise search results 400 from the enterprise search may identify a particular product or service offered by the enterprise, and social search results 405 from the social search may identify social connections affiliated with the enterprise, social contacts that had some level of knowledge regarding the product or service; comments and/or recommendations from different users from different social communities; and/or images related to the product or service. As such, users may gain additional information about or insight into the product or service rather than just from the information provided by the enterprise.

Figure 5:
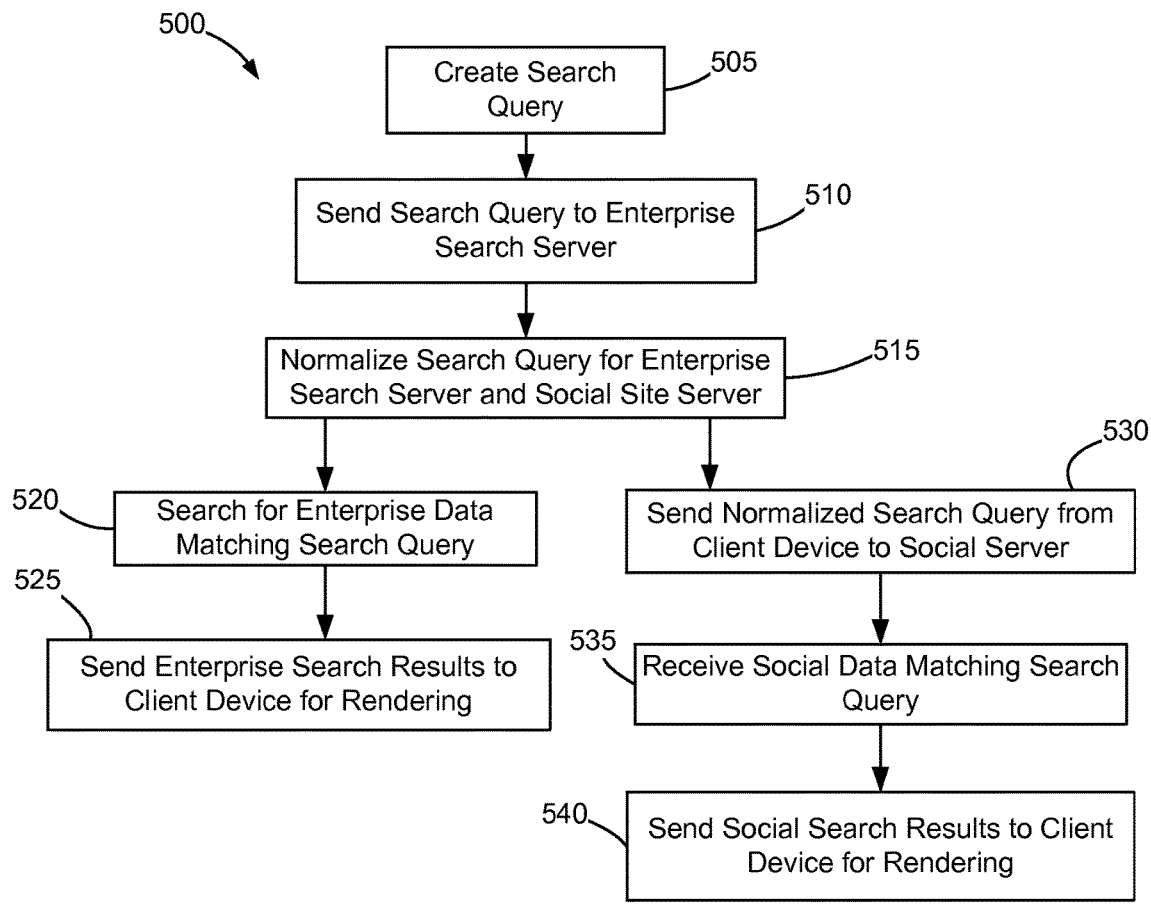
FIG. 5 is a flowchart of one example method for searching data on multiple domains.
Figure 6:
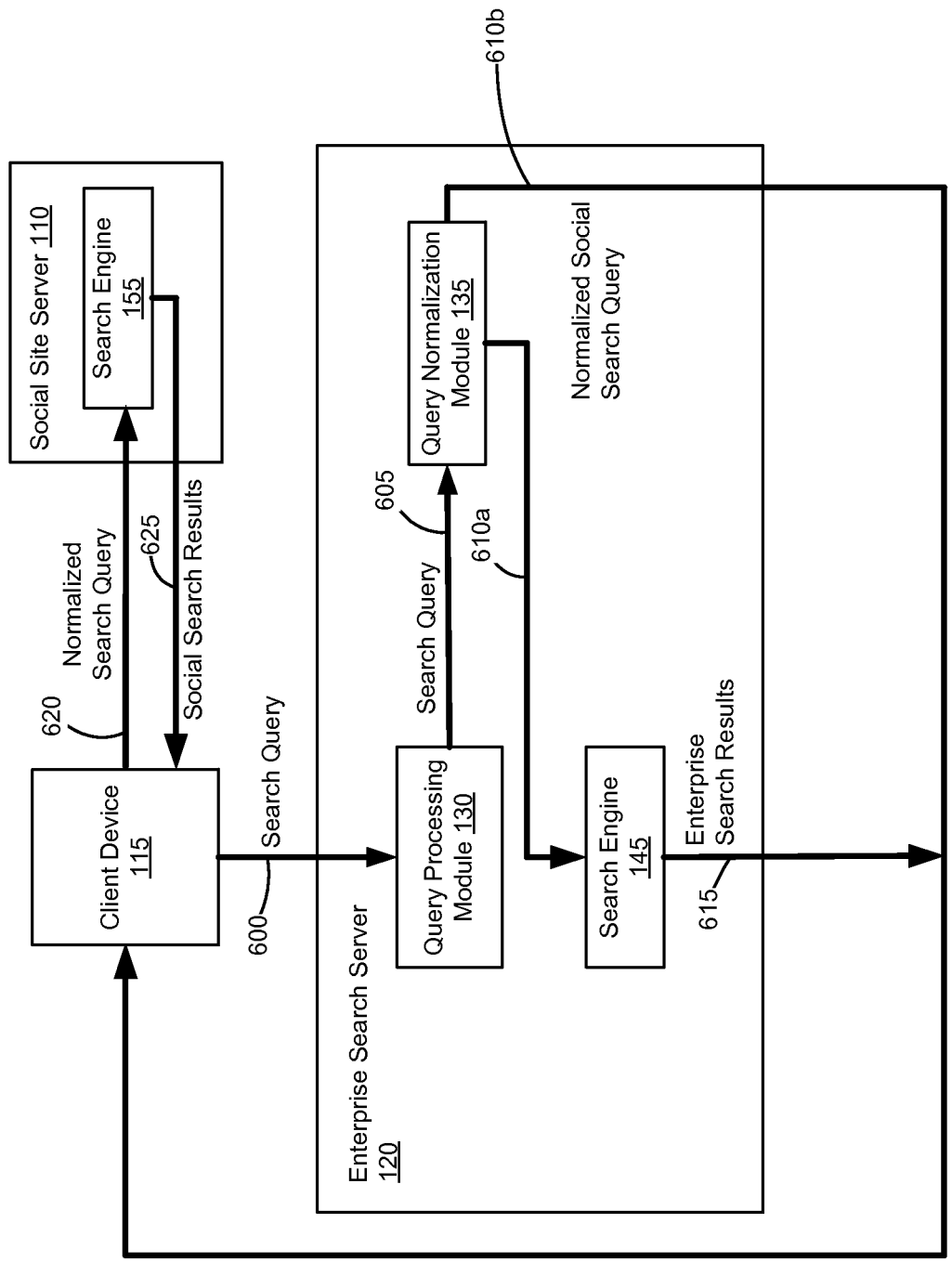
FIG. 6 is one example block diagram illustrating one example flow of communication between a client device, an enterprise search server, and a social site server in the networked system of FIG. 1, in accordance with the example method of FIG. 5.

FIGS. 5 and 6 illustrate one example embodiment of enabling a user to search data on multiple domains using networked system 100. FIG. 5 is a flowchart of one example method 500 for enabling a user to search data on multiple domains, such as the domains of enterprise search server 120 and social site servers 110*a*, 110*b*, using a search query initiated on a device, such as client device 115. Example method 500 may enable an enterprise-based system to provide search results comprising enterprise data matching the search query and related social data from external social sites. FIG. 6 is one example block diagram showing the flow of communication between client device 115, enterprise search server 120 and social site server 110 in accordance with actions or events of example method 500.

When performing a search, search web page 200 may be accessed by the user using client device 115. Prior to initiating a search request, the user may access preferences page 300 to set desired search options and/or settings. For example, the user may configure the search to include searching of social data by enabling Social Explorer option 325. In some aspects, a system administrator or other person may configure the search to include searching of social data. In some aspects, the configuration may be stored for future use.

At block 505, a search query may be created by the user through search web page 200. The user may enter a term, word or combination of characters representing a subject or item for which the user wishes to search. In one example aspect, the search query may include Boolean logic operators that allow users to refine or extend the terms of the search. In another example aspect, the search query may include natural language. In still another example aspect, the search query may be a combination of Boolean logic operators and natural language. An input device may be used by the user to define or input the search terms in search field 205. In example search web page 200 shown in FIG. 2, the term "color" is entered in search field 205 and constitutes a subject relevant to content the user seeks or desires.

After defining the search terms in search field 205, the user may initiate the search query by activating search control button 210. Once the search query is initiated, the search query is communicated, sent or transmitted to enterprise search server 120 at block 510 of FIG. 5 (shown as communication link 600 in FIG. 6). In one example embodiment, the transmitted search query may include the terms defined in search field 205, an indication whether to search for social data and/or the social site services 335 selected for searching in relation to an enablement of Social Explorer option 325 in FIG. 3. In some other example embodiments, a search may be automatically sent or transmitted to enterprise search server 120 when a pre-designated key, such as an enter or return key, is depressed.

In one example aspect, the search query may be received by query processing module 130 of enterprise server 120, which may analyze search attributes of the search query. For example, query processing module 130 may analyze or examine search attributes of the search query, including defined terms, and the user selected options and configurations, such as the indication whether to enable social search and/or the social sites that were selected in preferences page 300. In some example embodiments, query processing module 130 analyzes attributes of the search query after forwarding the search query to query normalization module 135.

At block 515, query processing module 130 may forward or transmit the search query to query normalization module 135 (shown as communication link 605 in FIG. 6). Query normalization module 135 may be programmed with instructions to convert the search query to a format(s) suitable for or recognizable to enterprise search engine 145 and destination social search engine 155.

Query syntax used by enterprise search engine 145 is known to or recognized by query normalization module 135. Accordingly, query normalization module 135 may convert or normalize search attributes of the search query into a suitable syntax or format prior to submitting the search query to enterprise search engine 145.

In one example aspect, query syntax used by each search engine 155 associated with the social sites listed in preferences page 300 may be known to or recognized by query normalization module 135. Accordingly, query normalization module 135 may convert or normalize search attributes of the search query into a suitable syntax for submission to a destination search engine of the corresponding selected social site.

The converted or normalized enterprise search query outputted by query normalization module 135 is transmitted to enterprise search engine 145 (shown as communication link 610*a* in FIG. 6), and the converted or normalized social site search query is transmitted to client device 115 (shown as communication link 610*b* in FIG. 6). In one example embodiment, the normalized social search query may be sent to client device 115 before, together with or following the enterprise search results.

In one example aspect, the search query initially transmitted by client device 115 to enterprise search server 120 may already be in a format suitable for presentation to enterprise search engine 145 and/or social search engine 155. In such example aspects, the format of the initial search query sent to query normalization module 135 may be identical to the outputted format(s) of the search query sent to enterprise search engine 145 and/or social search engine 155.

At block 520, the normalized enterprise search query may then be used by enterprise search engine 145 to search enterprise database 140 for enterprise content or data matching the search query. The results of the enterprise search may be provided or sent to client device 115 by enterprise search server 120 (shown as communication link 615 in FIG. 6) simultaneously with, before or after the social search query is transmitted to client device 115. If matching enterprise data exists, enterprise search engine 145 may return enterprise search results corresponding to the matching enterprise data to client device 115 via network 105 for rendering or displaying to the user at block 525. If no matching data is located or identified, enterprise search engine 145 may provide an indication that no matching enterprise data exists to client device 115.

The enterprise search results, or at least a portion thereof, may be rendered or displayed on user interface 125 of client device 115 at block 525, for viewing by the user. In the example shown in FIG. 4, enterprise search results 400 are displayed on search web page 200. Enterprise search results 400 may include any information related to the search query, and such information may be in any suitable format. For example, the information may in any image, text, audio or audio-visual format. For example, performing the search query of FIG. 2 returns enterprise search results in the forms of product images, title fields, and descriptive information of color printers which are relevant to the search term "color" previously entered. As will be appreciated, URLs and other information or fields may be included in the displayed search results depending upon the item or term searched. If no matching enterprise data is found by enterprise search engine 145, a message may be displayed on search web page 200 which indicates that no matching enterprise data exists.

In some example aspects, the enterprise search results are displayed immediately upon receipt by client device 115. By immediately rendering the enterprise results on user interface 100 after completion of the enterprise search and prior to initiating the social search, users will not experience latency in the display of search results.

At block 530, once client device 115 receives the normalized social search query, client device 115 may automatically initiate the social search by sending or transmitting the normalized search query to destination social search engine 155 of each of social site server 110 desired by the user (shown as communication link 620 in FIG. 6). In some alternate example embodiments, the normalized search query may be transmitted to destination social search engine 155 of each of desired social site server 110 after the rendering of the enterprise search results at block 525.

In order to communicate with each desired social search engine 155, client device 115 may include program instructions or functions that may allow client device 115 to access services of the corresponding or associated social site server 110. For example, program instructions or functions may allow client device 115 to access social search engine 155 and receive social information therefrom, such as through a search engine API associated with social search engine 155.

Social search engine 155 may receive the normalized search query and search its associated database 55 to identify social content matching the normalized search query. For example, social search engine 155 may search for textual content, photographic content, audio content, video content, feed content, user profiles, discussions, and/or other information available within its associated social site database that matches the normalized search query.

Social search engine 155 may search its associated database for public social data and, in some example aspects, selectively, private social data associated with the user. Accessing private information associated with the user by social search engine 155 may require user authentication with the desired social site. For example, search web page 200 may include functions for sending user credentials to social site server 110. In turn, an application at social site server 110 may receive the user credentials and verify whether the user credentials are valid. If the user credentials are determined to be valid, social site server 110 may allow social search engine 155 to search for private data associated with the user based on the received user credentials. If the user credentials are determined to be invalid, social site server 110 may allow social search engine 155 to search only for public data.

In one example embodiment, user authentication may be launched directly from user interface 125 on client device 115. For example, an authentication window may be displayed on client device 115 prompting the user for authentication information. In another example embodiment, the authentication window may appear upon user activation, such as by clicking a link or icon associated with a social site on user interface 125. For example, in FIG. 4, an authentication window (not shown) prompting the user to enter Facebook® log-in credentials may be launched if the user depresses, selects or otherwise activates Facebook® control button 410. It is further contemplated that other forms of user-initiated actions may be used to trigger the authentication window to appear on user interface 125 of client device 115, and the timing of which may be before or after a search query of the desired social site(s) is initiated. In some alternate example embodiments, as shown in FIG. 3, preferences page 300 may include fields 340 for entering user credentials, and if the user has entered user credentials, client device 115 may automatically pass or transmit the entered user credentials for authentication by social site server 110. Because client device 115 directly communicates user authentication information to social site server 110, no user credentials will be transmitted to or stored on enterprise search server 120.

After searching its associated database for social data matching the normalized search query, social site server 110 may send the social search results to client device 115 at block 535 (shown as communication link 625 in FIG. 6). If no user credentials have been provided, or if the provided user credentials are invalid, the user may be provided with social search results that are related to content associated with public social information. Otherwise, social search results may also include private social information associated with the user.

The social search results may be received by client device 115 and rendered on user interface 125 of client device 115 at block 540. In one example embodiment, as shown in FIG. 4, social search results 400, or at least portions thereof, may be rendered on the same page as the page displaying enterprise search results 405. In one example aspect, social search results 405 may be rendered on the same page as the page displaying enterprise search results 400 without redrawing or refreshing enterprise search results 400 on search web page 200. In another example aspect, social search results 405 may be grouped, arranged or otherwise organized based on or according to the social site source. Different techniques known in the art may be used to render the search results on search web page 200.

In the above example embodiments, social search has been described with client device 115 directly reaching out to social site server 110 to receive social search results therefrom. In an alternative example embodiment, enterprise search server 120 may be configured to act as a proxy server to facilitate access to social content on a social site.

Figure 7:
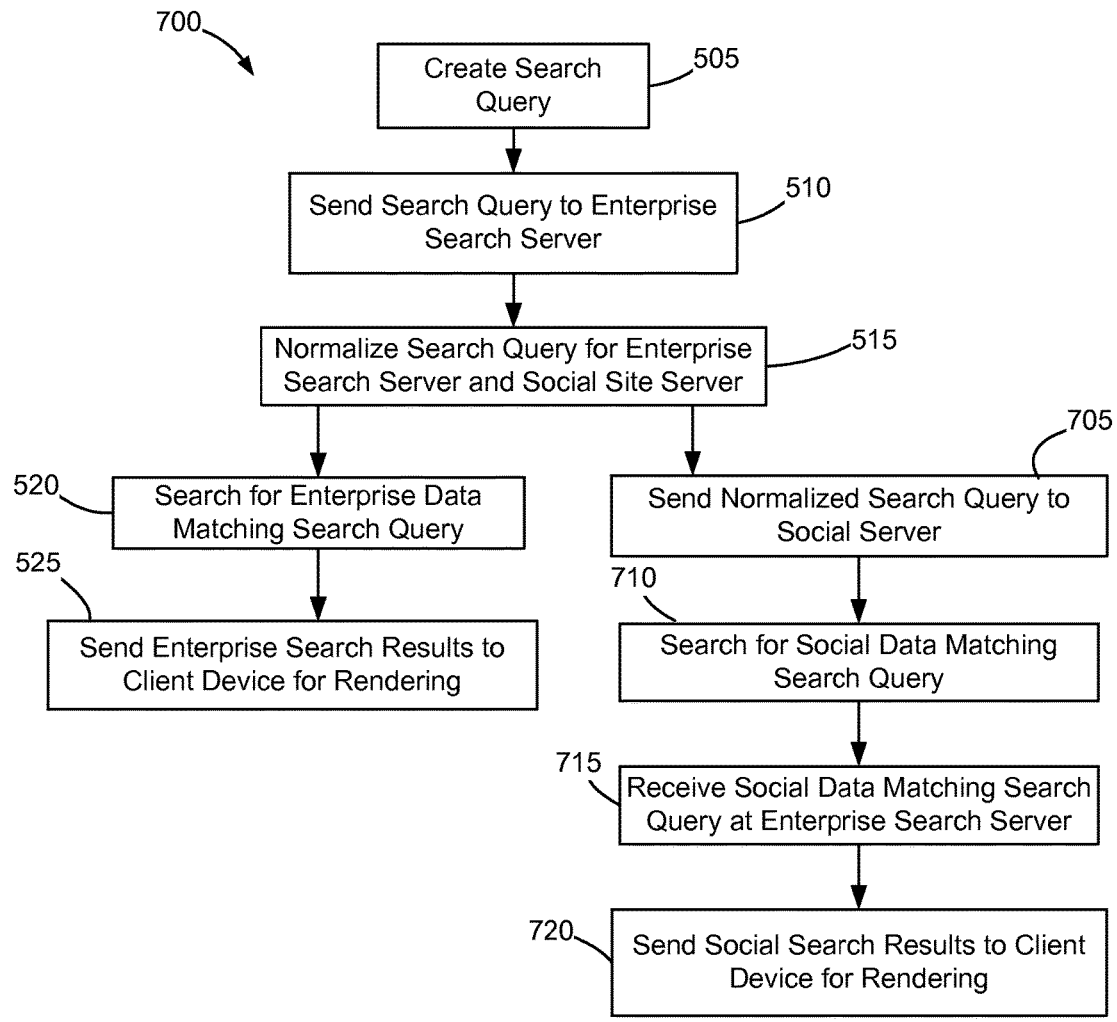
FIG. 7 is a flowchart of a second example method for searching data on multiple domains.
Figure 8:
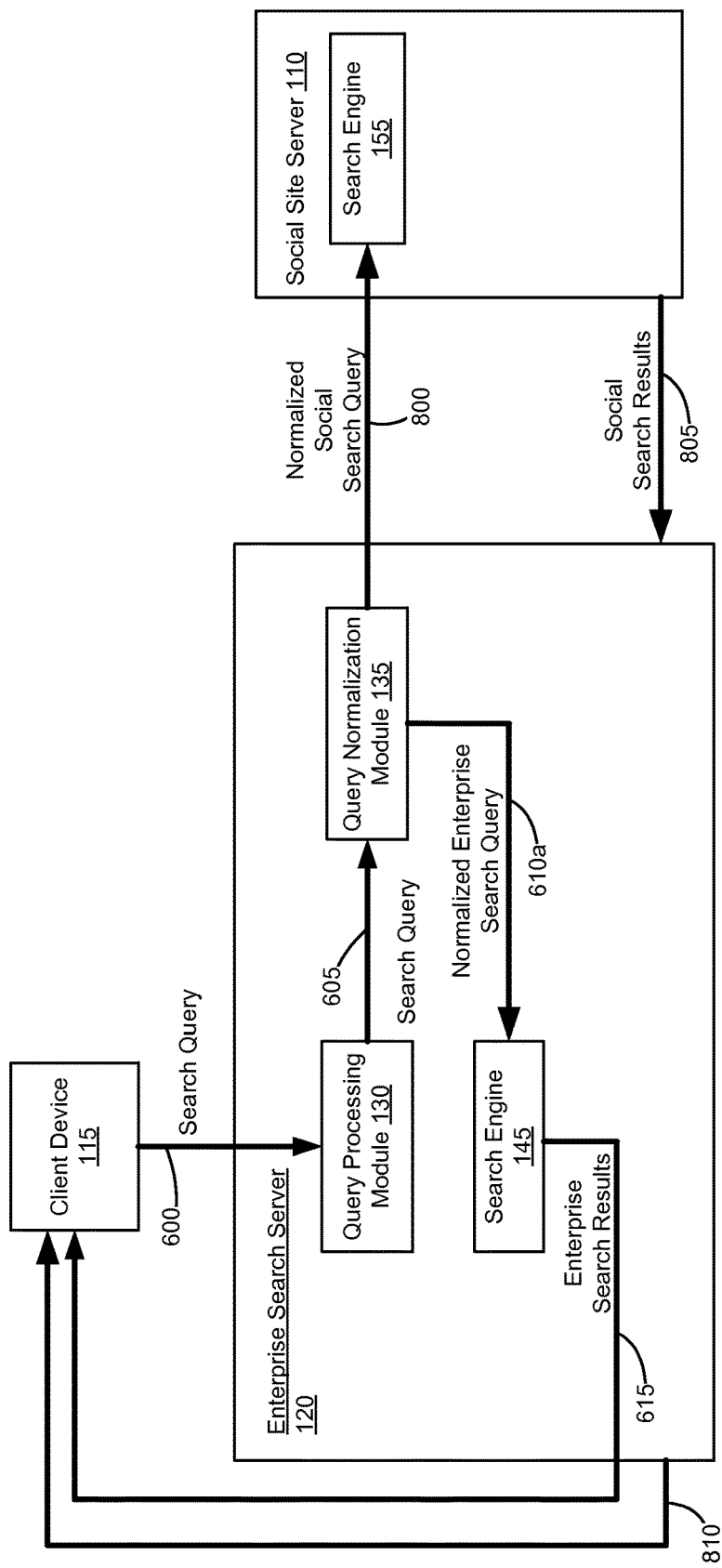
FIG. 8 is one example block diagram showing the flow of communication between the client device, the enterprise search server, and the social site server in the networked system of FIG. 1, in accordance with the example method of FIG. 7.

FIG. 7 is a flowchart of one example alternate method 700 for searching of enterprise data and social data using a search query initiated on client device 115, with enterprise search server 120 acting as a proxy server for client device 115. FIG. 8 is an example block diagram showing the flow of communication between client device 115, enterprise search server 120, and social site server 110, in accordance with actions or events of example method 800. In example method 800, actions performed at blocks 505 and 510 are identical to the actions performed at blocks 505 and 510 of example method 500 of FIG. 5.

As in block 505 of FIG. 5, a search query may be created by the user using client device 115. The user may enter a term, word or combination of characters representing a subject or item for which the user wishes to search. In one example aspect, the search query may include Boolean logic operators that allow users to refine or extend the terms of the search. In another example aspect, the search query may include natural language. In still another example aspect, the search query may be a combination of Boolean logic operators and natural language. An input device may be used by the user to define or input the search terms in search field 205. Using the example search query shown in search web page 200 of FIG. 2, the term "color" is entered in search field 205 and constitutes a subject relevant to content the user seeks or desires.

After defining the search terms in search field 205, the user may initiate the search query by activating search control button 210. Once the search query is initiated, the search query is communicated, sent or transmitted to enterprise search server 120 at block 510 of FIG. 8 (shown as communication link 600 in FIG. 8). In one example embodiment, the transmitted search query may include the terms defined in search field 205, an indication whether to search for social data and/or the social site services 145 selected for searching in relation to an enablement of Social Explorer option 325 in FIG. 3. In some other example embodiments, a search may be automatically sent or transmitted to enterprise search server 120 when a pre-designated key, such as an enter or return key, is depressed.

In one example aspect, the search query may be received by query processing module 130 of enterprise server 120, which may analyze search attributes of the search query. For example, query processing module 130 may analyze or examine search attributes of the search query, including defined terms, and the user selected options and configurations, such as the indication whether to enable social search and/or the social sites that were selected in preferences page 300. In some example embodiments, query processing module 130 analyzes attributes of the search query after forwarding the search query to query normalization module 135.

At block 515, query processing module 130 may forward or transmit the search query to query normalization module 135 (shown as communication link 605 in FIG. 8). Query normalization module 135 may be programmed with instructions to convert the search query to a format(s) suitable for or recognizable to enterprise search engine 145 and destination social search engine 155.

Query syntax used by enterprise search engine 145 is known to or recognized by query normalization module 135. Accordingly, query normalization module 135 may convert or normalize search attributes of the search query into a suitable syntax or format prior to submitting the search query to enterprise search engine 145. In order for enterprise search server 120 to send search queries to and receive social results from social site server 110 in example method 800, enterprise search server 120 may be registered with an application that allows enterprise search server 120 to effectively communicate with social site server 110. The application may be configured by an authorized user, such as, for example, an enterprise administrator.

In one example aspect, query syntax used by each search engine 155 associated with the social sites listed in preferences page 300 may be known to or recognized by query normalization module 135. Accordingly, query normalization module 135 may convert or normalize search attributes of the search query into a suitable syntax for submission to a destination search engine of the corresponding selected social site.

The converted or normalized enterprise search query outputted by query normalization module 135 is transmitted to enterprise search engine 145 (shown as communication link 610*a* in FIG. 8), and the converted or normalized social site search query is transmitted to social site server 110 (shown as communication link 800 in FIG. 8). In one example embodiment, the normalized social search query may be sent to social site server 110 before, together with or following the enterprise search results being sent from enterprise search engine 145 to client device 115.

In one example aspect, the initial search query transmitted by client device 115 to enterprise search server 120 may already be in a format suitable for presentation to enterprise search engine 145 and/or social search engine 155. In such example aspects, the format of the search query sent to query normalization module 135 may be identical to the outputted format(s) of the search query sent to enterprise search engine 145 and/or social search engine 155.

At block 520, the normalized enterprise search query may then be used by enterprise search engine 145 to search enterprise database 140 for enterprise content or data matching the search query, and the results of the enterprise search may be automatically provided or sent to client device 115 by enterprise search server 120 (shown as communication link 615 in FIG. 6) upon the completion of the enterprise search. If matching enterprise data exists, enterprise search engine 145 may return enterprise search results corresponding to the matching enterprise data to client device 115 via network 105 for rendering or displaying to the user at block 525. If no matching data is located or identified, enterprise search engine 145 may provide an indication to client device 115 that no matching enterprise data exists.

The enterprise search results, or at least a portion thereof, may be rendered or displayed on user interface 100 of client device 115 at block 525, for viewing by the user. In the example shown in FIG. 4, enterprise search results 400 are displayed on search web page 200. Enterprise search results 400 may include any information related to the search query, and such information may be in any suitable format. For example, the information may in any image, text, audio or audio-visual format. For example, performing the search query of FIG. 2 returns enterprise search results in the forms of product images, title fields, and descriptive information of color printers which are relevant to the search term "color" previously entered. As will be appreciated, URLs and other information or fields may be included in the displayed search results depending upon the item or term searched. If no matching enterprise data is found by enterprise search engine 145, a message may be displayed on search web page 200 indicating that no matching enterprise data exists.

At block 705, social search engine 155 of social site server 110 receives the normalized social search query from enterprise search server 120, and social search engine 155 searches its associated database for public social data or content matching the normalized search query at block 710. For example, social search engine 155 may search for textual content, photographic content, audio content, video content, feed content, user profiles, discussions, and/or other information available within its associated social site database that matches the normalized search query. Social search engine 155 may also selectively search for matching private social data or content associated with the user based on received user credentials. Social searches are performed by each of social search engines 155 desired by the user. In one example aspect, the user credentials provided by the user, as described above, may be stored on enterprise search server 120 for use in subsequent social search operations.

At block 715, social site server 110 may return or send the social search results, public and/or private, matching the normalized search query to enterprise search server 120 (shown as communication link 805 in FIG. 8) via network 105. Enterprise search server 120 may then forward or transmit the matching social search results to client device 115 (shown as communication link 810 in FIG. 8) for rendering on client device 115 for viewing by the user at block 720.

In one example aspect, the sending of enterprise search results 400 to client device 115 (block 520) and sending of the normalized search query to social site server 110 (block 805) may occur, at least in part, concurrently. Enterprise results 165 may be rendered on client device 115 immediately after the conclusion of the enterprise search, and social search results 405 may follow after completion of the social search such that the presentation of enterprise search results 400 and social search results 405 on client device 115 is asynchronous. Asynchronous presentation allows faster display of the search results from both enterprise search server 120 and social site server 110.

In one example aspect, social search results 405 may be rendered on the same page as the page displaying enterprise search results 400 without redrawing or refreshing enterprise search results 400 on search web page 200. In another example aspect, social search results 405 may be grouped, arranged or otherwise organized based upon or according to the social site source. Different techniques known in the art may be used to render the search results on search web page 200.

Figure 9:
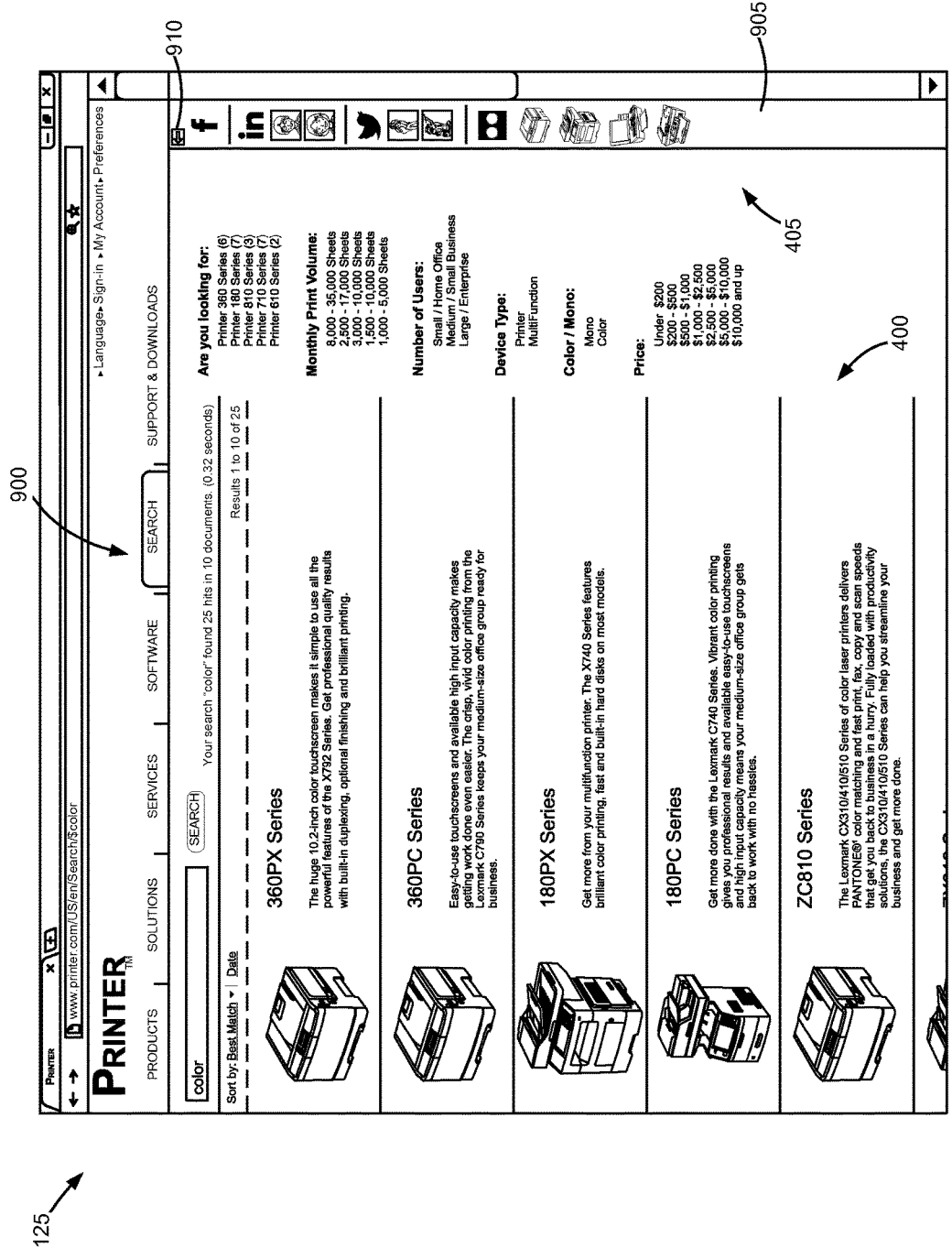
FIG. 9 illustrates a second example user interface for displaying search results.

As shown in FIG. 9, regardless of the search method utilized to search data on multiple domains, social search results 405 may be rendered on a search web page 900 in such a manner that it does not obscure enterprise search results 400 in some example embodiments. In one example aspect, the available space (or white space) for displaying the social search results 405 may be automatically calculated before displaying the social search results 405. The available space may be determined based on factors associated with user interface 125 such as, for example, the size of user interface 125, the size of the browser window, the resolution of the user interface 125, and the browser zoom level. In one example aspect, it may be determined that the space available is wide enough if a predetermined area for displaying social search results 405 does not overlap with an area for displaying the enterprise search results 400 and social search results 405 will not obscure the enterprise search results 400. If it is determined that the available space is wide enough to display the social search results 405, social search results 405 may be automatically displayed in expanded form, as shown in FIG. 4. In other example aspects, if the space available to display social search results 405 is determined to be not wide enough, social search results 405 may be displayed using a flyout menu 905, as shown in FIG. 9. In such example aspects, flyout menu 905 may expand to show additional information of the social search results 405 (as shown in FIG. 4) only when a control button 910, illustrated as an arrow button in FIG. 9, is clicked or depressed. In addition, the user may also activate control button 910 to partially hide flyout menu 900 to hide at least portions of social search results 405 and clearly display enterprise search results 400.

It will be understood that the example applications described herein are illustrative and should not be considered limiting. Although no specific technology has been discussed in relation to carrying out and conducting the methods and concepts provided herein, a number of suitable existing technologies from various platforms may be used for implementing the above example embodiments such as for example, JavaScript, AJAX, JSON, HTML, CSS, and so forth. It will be appreciated that users may navigate the user interface in many other ways such as by selectively interacting with icons, buttons, menus, data fields and the like displayed in the user interface. It will also be appreciated that the actions described and shown in the example flowcharts may be carried out or performed in any suitable order. It will also be appreciated that not all of the actions described herein need to be performed in accordance with the example embodiments of the disclosure and/or additional actions may be performed in accordance with other example embodiments of the disclosure.

Many modifications and other example embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A method for retrieving content from multiple sources, the method comprising:
   transmitting a search query to a first source;
   receiving, from the first source, information from the first source, the information being one of content matching the search query if content matching the search query is identified by the first source and an indicator of no content match if no content matching the search query is identified by the first source;
   receiving, from the first source, a normalized search query based upon the search query for transmission to a second source, the normalized search query being the search query converted into a format and a syntax recognizable by both the first source and the second source;
   transmitting the normalized search query to the second source;
   receiving, from the second source, content matching the normalized search query if content matching the normalized search query is identified by the second source; and
   displaying on a user interface the information received from the first source and the matching content from the second source;
   wherein displaying on the user interface the information received from the first source and the matching content from the second source comprises calculating an available white space for displaying the information received from the first source and the matching content from the second source; and
   wherein the calculation is based at least in part on: a size of user interface, a size of a browser window, a resolution of the user interface, and a browser zoom level.

2. The method of claim 1, further comprising:
   rendering at least a portion of the content matching the normalized search query on a user interface; and
   rendering at least a portion of the content matching the search query on the user interface.

3. The method of claim 2, wherein the rendering at least the portion of the content matching the search query and the rendering the at least the portion of the content matching the search query occurs asynchronously.

4. The method of claim 2, wherein the rendering at least the portion of the content matching the normalized search query occurs without obscuring the rendering at least the portion of the content matching the search query.

5. The method of claim 2, wherein the rendering at least a portion of the matching content matching the normalized search query on the user interface displays the portion of the content matching the normalized search query on a display without refreshing the display.

6. The method of claim 2, wherein the rendering at least a portion of the content matching the normalized search query on the user interface displays the portion of the content matching the normalized search query on a display without redrawing the display.

7. The method of claim 2, wherein the rendering at least a portion of the content matching the normalized search query on the user interface displays the portion of the content matching the normalized search query on a display without obscuring the content matching the search query.

8. The method of claim 3, further comprising: automatically calculating a space available for the rendering the at least the portion of the content matching the normalized search query.

9. The method of claim 2, wherein the rendering at least a portion of the content matching the normalized search query renders the at least a portion of the content matching the normalized search query content on a flyout menu located on the user interface displaying the content matching the search query.

10. A non-transitory computer-readable storage medium storing instructions, that when executed by a computer, cause the computer to perform a method for searching data on multiple domains, the method comprising:
transmitting a search query to a first source;
receiving, from the first source, information from the first source, the information being one of content matching the search query if content matching the search query is identified by the first source and an indicator of no content match if no content matching the search query is identified by the first source;
receiving, from the first source, a normalized search query based upon the search query for transmission to a second source, the normalized search query being the search query converted into a format and a syntax recognizable by both the first source and the second source;
transmitting the normalized search query to the second source;
receiving, from the second source, content matching the normalized search query if content matching the normalized search query is identified by the second source; and
displaying on a user interface the information received from the first source and the matching content from the second source;
wherein displaying on the user interface the information received from the first source and the matching content from the second source comprises calculating an available white space for displaying the information received from the first source and the matching content from the second source; and
wherein the calculation is based at least in part on: a size of user interface, a size of a browser window, a resolution of the user interface, and a browser zoom level.

11. The non-transitory computer-readable storage medium of claim 10, wherein the method performed further comprises:
rendering at least a portion of the content matching the normalized search query on a user interface; and
rendering at least a portion of the content matching the search query on the user interface.

12. The method of claim 1, further comprising
rendering at least a portion of the content matching the normalized search query on a user interface; and
rendering at least a portion of the content matching the search query on the user interface; and
wherein the rendering at least a portion of the content matching the normalized search query renders the at least a portion of the content matching the normalized search query on a flyout menu located on the user interface displaying the matching normalized search query content.

13. The method of claim 1, further comprising rendering the content matching the search query on a web page; and
rendering the content matching the normalized search query on the web page without redrawing or refreshing the content matching the search query; and
wherein the content matching the normalized search query is rendered on the web page so as not to obscure the content matching the search query.

14. The method of claim 13, further comprising:
wherein rendering the content matching the normalized search query comprises:
calculating an amount of available whitespace on the web page after rendering the content matching the search query on the web page;
determining whether the amount of available whitespace on the web page after rendering the content matching the search query on the web page is at least as wide as a predetermined width;
displaying the content matching the normalized search query within the available whitespace in response to determining the amount of available whitespace on the web page after rendering the content matching the search query on the web page is at least as wide as the predetermined width; and
displaying the content matching the normalized search query within a flyout menu in response to determining the amount of available whitespace on the web page after rendering the content matching the search query on the web page is less wide than the predetermined width.

* * * * *

UNITED STATES PATENT AND TRADEMARK OFFICE
CERTIFICATE OF CORRECTION

PATENT NO. : 10,331,688 B2  
APPLICATION NO. : 14/609102  
DATED : June 25, 2019  
INVENTOR(S) : Thomas David Montgomery, Derek Cunninghame Murphy and Benjamin Stephen Truscott Page 1 of 1

It is certified that error appears in the above-identified patent and that said Letters Patent is hereby corrected as shown below:

In the Claims

Claim 3, at Column 16, Line 48 should recite --"the portion of the content matching the normalized search query and the"--

Signed and Sealed this
Seventeenth Day of September, 2019

Andrei Iancu
*Director of the United States Patent and Trademark Office*